(12) United States Patent
Chen et al.

(10) Patent No.: US 8,462,302 B2
(45) Date of Patent: Jun. 11, 2013

(54) MULTI-DOMAIN VERTICAL ALIGNMENT LIQUID CRYSTAL DISPLAY DEVICE AND PIXEL STRUCTURE THEREOF

(75) Inventors: Cho-Yan Chen, Hsin-Chu (TW);
Kuan-Chun Huang, Hsin-Chu (TW);
Ching-Huan Lin, Hsin-Chu (TW);
Ching-Sheng Cheng, Hsin-Chu (TW);
Chih-Hung Shih, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 331 days.

(21) Appl. No.: 12/756,204

(22) Filed: Apr. 8, 2010

(65) Prior Publication Data

US 2011/0141420 A1 Jun. 16, 2011

(30) Foreign Application Priority Data

Dec. 14, 2009 (TW) ................................ 98142692 A (51) Int. Cl.
*G02F 1/1335* (2006.01)

(52) U.S. Cl.
USPC .......................................... 349/129; 349/102

(58) Field of Classification Search
USPC ...................... 346/129; 349/99, 102–103, 129
See application file for complete search history.

(56) References Cited

U.S. PATENT DOCUMENTS

| 6,839,112 | B2 | 1/2005 | Chien | |
|---|---|---|---|---|
| 6,972,812 | B2 | 12/2005 | Lu | |
| 7,804,559 | B2 * | 9/2010 | Egi et al. | 349/96 |
| 8,199,283 | B2 * | 6/2012 | Iwamoto | 349/102 |
| 2004/0004690 | A1 * | 1/2004 | Yamaguchi et al. | 349/141 |
| 2006/0125992 | A1 | 6/2006 | Yoshida | |
| 2007/0200978 | A1 | 8/2007 | Ishitani | |
| 2009/0015762 | A1 | 1/2009 | Noguchi | |
| 2009/0244463 | A1 * | 10/2009 | Wang | 349/129 |
| 2009/0284705 | A1 | 11/2009 | Ogura | |
| 2010/0053511 | A1 * | 3/2010 | Ohmuro et al. | 349/102 |
| 2011/0164213 | A1 * | 7/2011 | Nakanishi et al. | 349/129 |

FOREIGN PATENT DOCUMENTS

| CN | 101581846 A | 11/2009 |
|---|---|---|
| JP | 10170907 | 6/1998 |
| TW | 200305764 | 11/2003 |
| TW | 200745676 | 12/2007 |
| TW | 200909959 | 3/2009 |
| TW | 200941072 | 10/2009 |

* cited by examiner

Primary Examiner — Eric Wong
(74) Attorney, Agent, or Firm — Winston Hsu; Scott Margo (57) ABSTRACT

An MVA LCD device includes a first alignment region, a second alignment region, a third alignment region, and a fourth alignment region. The liquid crystal molecules disposed in the first alignment region have a first aligning direction, and the azimuth angle of the first aligning direction is substantially between 70 and 110 degrees. The liquid crystal molecules disposed in the second alignment region have a second aligning direction, and the azimuth angle of the second aligning direction is substantially between 160 and 200 degrees. The liquid crystal molecules disposed in the third alignment region have a third aligning direction, and the azimuth angle of the third aligning direction is substantially between 250 and 290 degrees. The liquid crystal molecules disposed in the fourth alignment region have a fourth aligning direction, and the azimuth angle of the fourth aligning direction is substantially between −20 and 20 degrees.

26 Claims, 11 Drawing Sheets

MULTI-DOMAIN VERTICAL ALIGNMENT LIQUID CRYSTAL DISPLAY DEVICE AND PIXEL STRUCTURE THEREOF

BACKGROUND OF THE INVENTION

1. Field of the Invention

The present invention relates to a pixel structure of a multi-domain vertical alignment liquid crystal display device, and more specifically, to a pixel structure of a multi-domain vertical alignment liquid crystal display device without observation angle limitation.

2. Description of the Prior Art

A Liquid Crystal Display (LCD) device has advantages of being light and thin and, therefore has been widely applied in various electronic products, such as mobile phones, PDAs, and notebooks. As the technique of large-sized LCD panels rapidly advances, LCDs have gradually become mainstream products of flat panel televisions. However, due to the shortcoming of narrow viewing angles in conventional LCDs, a multi-domain vertical alignment (MVA) LCD has been developed. It has become a mainstream product in the market because of its characteristics of wide viewing angles and low response time.

Figure 1:
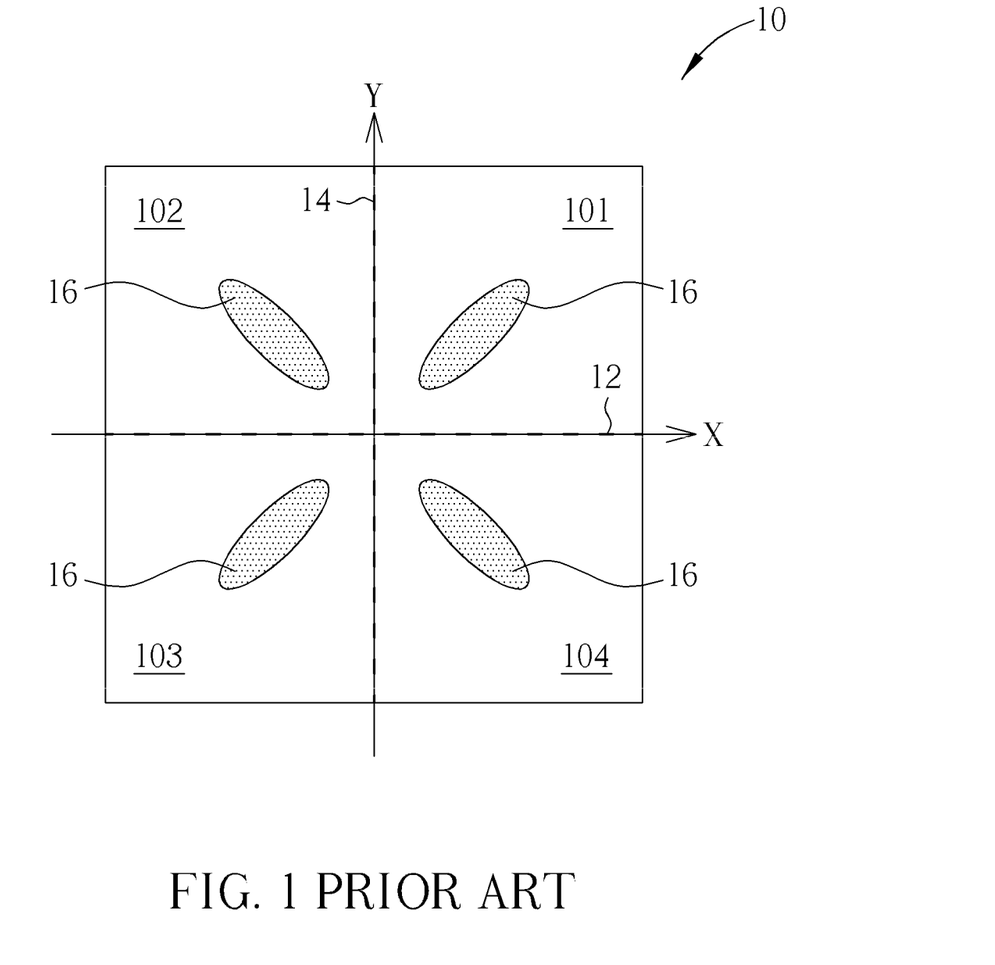
FIG. 1 is a schematic diagram showing a conventional pixel structure of an MVA LCD device.

FIG. 1 is a schematic diagram showing a pixel structure of a conventional MVA LCD device. As shown in FIG. 1, in the conventional pixel structure 10, an azimuth angle of the first absorption axis of a first polarization plate 12 is 0 degree, and an azimuth angle of the second absorption axis of the second polarization plate 14 is 90 degrees. Moreover, in different alignment regions 101, 102, 103, 104, the azimuth angles of the aligning directions of the liquid crystal molecules 16 are 45 degrees, 135 degrees, 225 degrees, and 315 degrees respectively.

In the conventional pixel structure 10, vertically-polarized light will be absorbed by the second absorption axis 14 but only horizontally-polarized light can pass through it. Therefore, the observers wearing horizontally-polarized sunglasses are not able to watch the display images of the MVA LCD device normally.

SUMMARY OF THE INVENTION

It is therefore one of the objectives of the present invention to provide a pixel structure of an MVA LCD device to reduce its limitation of observation angles.

According to an embodiment of the present invention, a pixel structure of an MVA LCD device is provided. The pixel structure includes a first substrate, a second substrate, a liquid crystal layer, and a pixel electrode. The first substrate includes a first alignment region and a second alignment region. The second substrate is disposed opposite to the first substrate. The liquid crystal layer includes a plurality of liquid crystal molecules disposed between the first substrate and the second substrate. The plurality of liquid crystal molecules disposed in the first alignment region have a first aligning direction. The plurality of liquid crystal molecules disposed in the second alignment region have a second aligning direction different from the first aligning direction. An azimuth angle of the first aligning direction and that of the second aligning direction are respectively selected from one of the following ranges: substantially between 70 and 110 degrees, substantially between 160 and 200 degrees, substantially between 250 and 290 degrees, and substantially between −20 and 20 degrees. The pixel electrode disposed between the first substrate and the liquid crystal layer.

In addition, the MVA LCD device of the present invention has a first absorption axis, and the azimuth angle of the first absorption axis is substantially between 25 and 65 degrees. An azimuth angle of an absorption axis of the second polarization plate is set to be between 115 and 155 degrees, and in the polarization angle, the azimuth angles of the liquid crystal molecules in different alignment regions are between 70 and 110 degrees, between 160 and 200 degrees, between 250 and 290 degrees, and between −20 and 20 degrees respectively. Through the design, the penetration rate of the MVA LCD device will not be decreased as the polarization angle of the polarization plate changes. Thus, the observers wearing polarized sunglasses with an effect of horizontally-polarized light filters are able to watch the display images of the MVA LCD device normally.

These and other objectives of the present invention will no doubt become obvious to those of ordinary skill in the art after reading the following detailed description of the preferred embodiment that is illustrated in the various figures and drawings.

DETAILED DESCRIPTION

Certain terms are applied throughout the following description and claims to refer to particular components. As those of ordinary skill will appreciate, manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . .".

Figure 2:
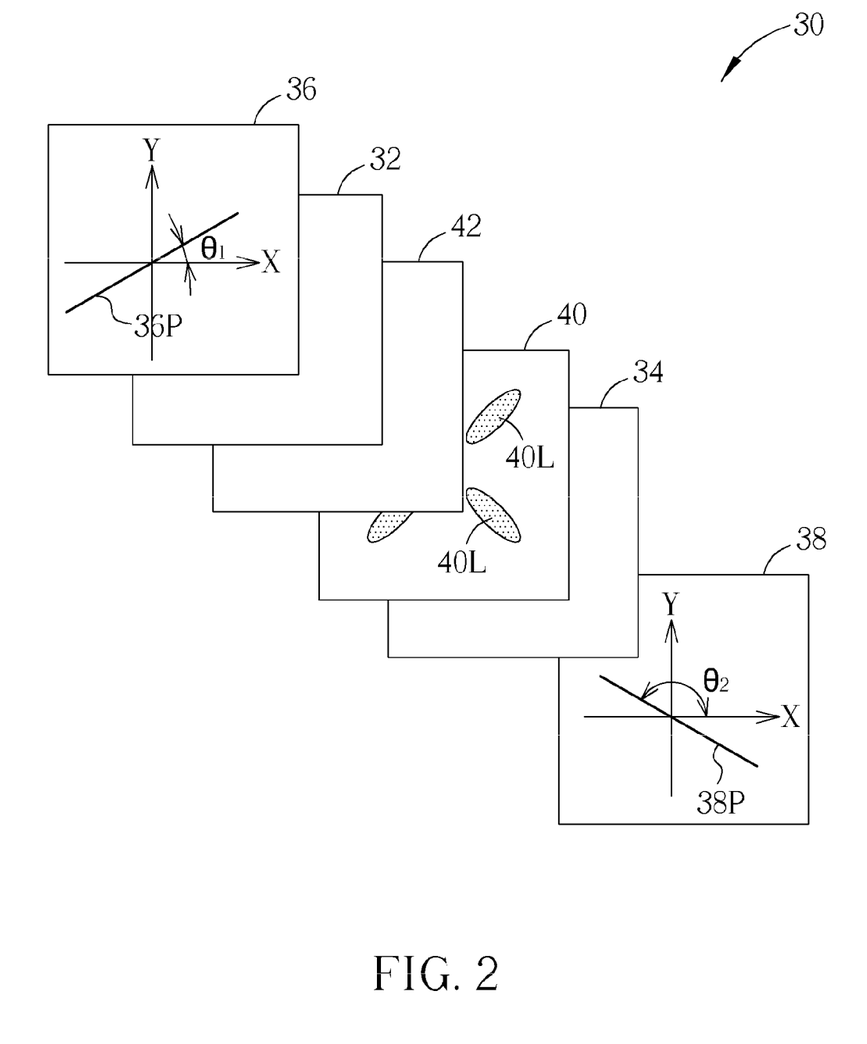
FIG. 2 and FIG. 3 are schematic diagrams showing a pixel structure of an MVA LCD device according to a preferred embodiment of the present invention.
Figure 3:
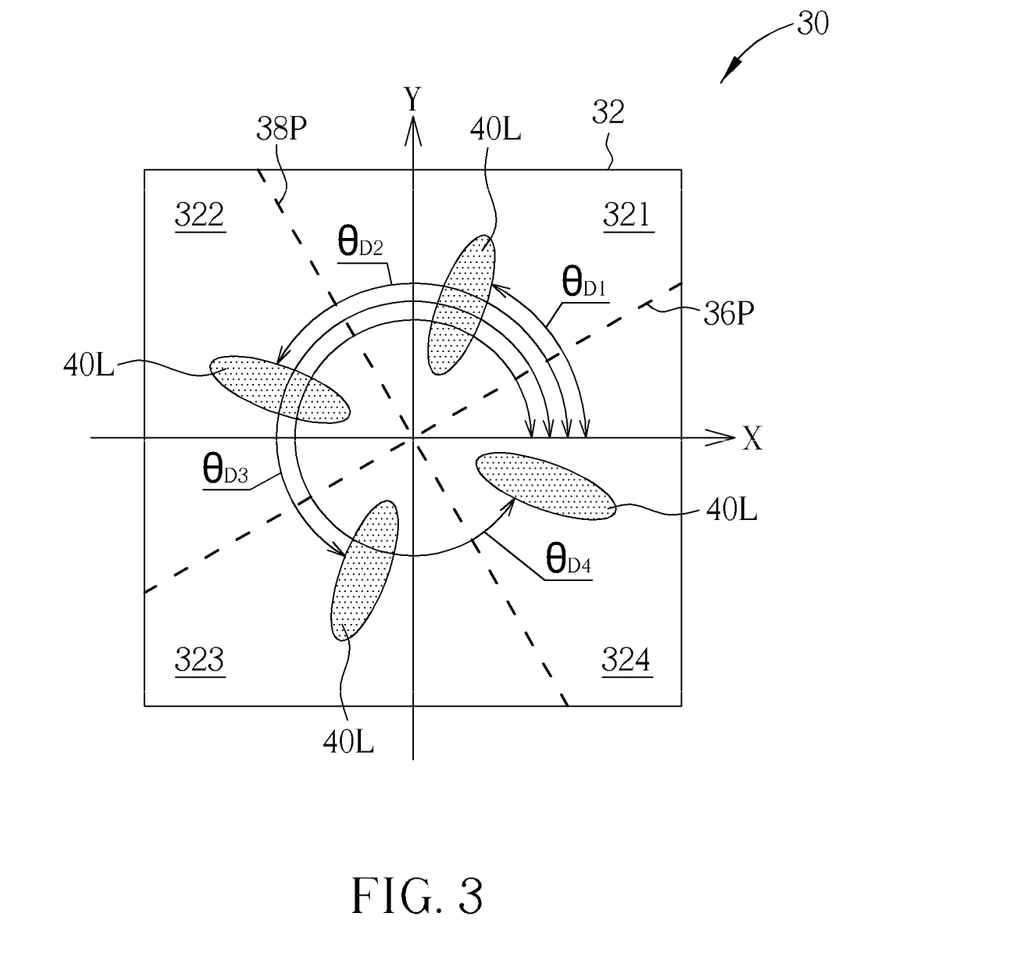

FIG. 2 and FIG. 3 are schematic diagrams showing a pixel structure of an MVA LCD device according to a preferred embodiment of the present invention. FIG. 2 is an explosive schematic diagram showing a pixel structure of the present embodiment and FIG. 3 is a top view showing a pixel structure of the present embodiment. Throughout the specification, an azimuth angle is used to describe the disposition direction of each component. That is, an azimuth angle of a horizontal axis (X-axis) is defined as 0 degree while a vertical axis (Y-axis) is defined as 90 degrees as shown by the arrows in FIG. 2, and a counterclockwise direction is defined as a positive increment. Referring to FIG. 2 and FIG. 3, a pixel structure of an MVA LCD device 30 of the present embodiment includes a first substrate 32, a second substrate 34, a first polarization plate 36, a second polarization plate 38, a liquid crystal layer 40, and a pixel electrode 42. The first substrate 32 includes a first alignment region 321, a second alignment region 322, a third alignment region 323, and a fourth alignment region 324. The first alignment region 321 is substantially disposed in the first quadrant; that is, the region of an azimuth angle between 0 degree and 90 degrees. The second alignment region 322 is substantially disposed in the second quadrant; that is, the region of an azimuth angle between 90 and 180 degrees. The third alignment region 323 is substantially disposed in the third quadrant; that is, the region of an azimuth angle between 180 and 270 degrees. The fourth alignment region 324 is substantially disposed in the fourth quadrant; that is, the region of an azimuth angle between 270 and 360 degrees. The second substrate 34 and the first substrate 32 are disposed opposite to each other. The first polarization plate 36 is disposed on the other side of the first substrate 32 opposing to the second substrate 34, and the second polarization plate 38 is disposed on the other side of the second substrate 34 opposing to the first substrate 32, but the present invention is not limited to this embodiment. For example, the first polarization plate 36 may be disposed on the other side of the second substrate 34 opposing to the first substrate 32, and the second polarization plate 38 may be disposed on the other side of the first substrate 32 opposing to the second substrate 34. The first polarization plate 36 has a first absorption axis 36P, and the second polarization plate 38 has a second absorption axis 38P. The first absorption axis 36P and the second absorption axis 38P are substantially perpendicular to each other. In the present embodiment, an azimuth angle θ1 of the first absorption axis 36P of the first polarization plate 36 is substantially between 25 and 65 degrees, preferably between 25 and 35 degrees, or preferably between 35 and 55 degrees, or preferably between 55 and 65 degrees. An azimuth angle θ2 of the second absorption axis 38P of the second polarization plate 38 is substantially between 115 and 155 degrees, preferably between 145 and 155 degrees, or preferably between 125 and 145 degrees, or preferably between 115 and 125 degrees. In the present embodiment, the second substrate 34 is the display surface of the MVA LCD device, and the light passing through the second absorption axis 38P of the second polarization plate 38 will be polarized between and 65 degrees; for instance, 30 degrees so that it will not be horizontally-directed light. In such case, even though the observers wear polarized sunglasses with an effect of horizontally-polarized light filters, they are able to watch the display images of the MVA LCD device normally.

The liquid crystal layer 40 includes a plurality of liquid crystal molecules 40L disposed between the first substrate 32 and the second substrate 34, and the pixel electrode 42 is disposed between the first substrate 32 and the liquid crystal layer 40. Regarding the pixel structure 30 in the present embodiment, the liquid crystal molecules 40L are arranged in line with the aligning directions in different alignment regions according to the azimuth angle of the first absorption axis 36P of the first polarization plate 36 and that of the second absorption axis 38P of the second polarization plate 38. The liquid crystal molecules 40L disposed in the first alignment region 321 have a first aligning direction, and the azimuth angle $\theta_{D1}$ of the first aligning direction is substantially between 70 and 110 degrees, preferably between 70 and 80 degrees, or preferably between 80 and 100 degrees, or preferably between 100 and 110 degrees. The liquid crystal molecules 40L disposed in the second alignment region 322 have a second aligning direction, and the azimuth angle $\theta_{D2}$ of the second aligning direction is substantially between 160 and 200 degrees, preferably between 160 and 170 degrees, or preferably between 170 and 190 degrees, or preferably between 190 and 200 degrees. The liquid crystal molecules 40L disposed in the third alignment region 323 have a third aligning direction, and the azimuth angle $\theta_{D3}$ of the third aligning direction is substantially between 250 and 290 degrees, preferably between 250 and 260 degrees, or preferably between 260 and 280 degrees, or preferably between 280 and 290 degrees. The liquid crystal molecules 40L disposed in the fourth alignment region 324 have a fourth aligning direction, and the azimuth angle $\theta_{D4}$ of the fourth aligning direction is substantially between −20 degrees (also represented as 340 degrees) and 20 degrees, preferably between −20 and −10 degrees (also represented as 350 degrees), or preferably between −10 and 10 degrees, or preferably between 10 and 20 degrees. For example, when the azimuth angle of the first absorption axis 36P of the first polarization plate 36 is 30 degrees, the azimuth angle $\theta_{D1}$ of the first aligning direction of the liquid crystal molecules 40L is preferably 75 degrees, the azimuth angle $\theta_{D2}$ of the second aligning direction of the liquid crystal molecules 40L is preferably 165 degrees, the azimuth angle $\theta_{D3}$ of the third aligning direction of the liquid crystal molecules 40L is preferably 255 degrees, and the azimuth angle $\theta_{D4}$ of the fourth aligning direction of the liquid crystal molecules 40L is preferably −15 degrees (also represented as 345 degrees), but the present invention is not limited to this embodiment. By the arrangement described above, the liquid crystal molecules 40L disposed in the first alignment region 321, the second alignment region 322, the third alignment region 323, and the fourth alignment region 324 have different aligning directions respectively so that the characteristic of wide viewing angles of the MVA LCD device of the present invention when viewed from diverse observation directions will be obtained.

Figure 4:
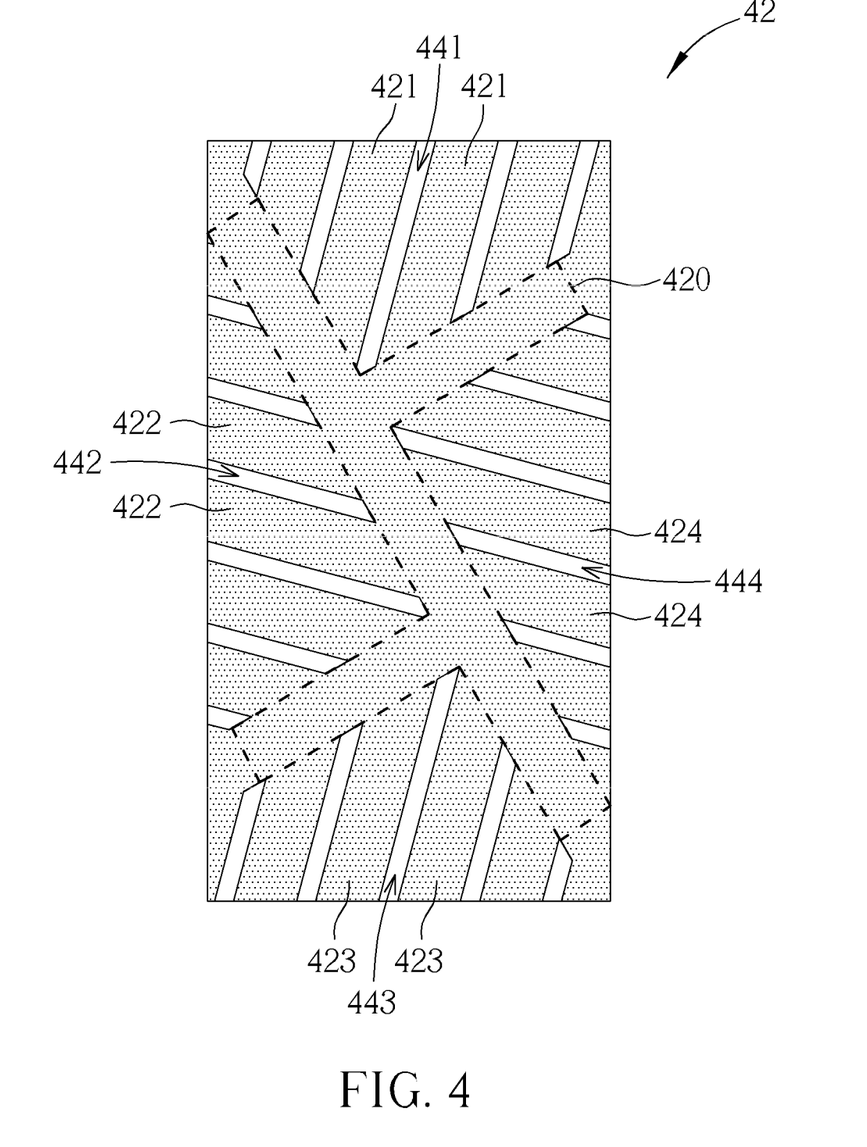
FIG. 4 is a schematic diagram showing a pixel electrode of the present embodiment.

In the present embodiment, different aligning directions of the liquid crystal molecules 40L disposed in the first alignment region 321, the second alignment region 322, the third alignment region 323, and the fourth alignment region 324 are achieved by pattern design of the pixel electrode 42. Refer to FIG. 4, along with FIG. 2 and FIG. 3. FIG. 4 is a schematic diagram showing a pixel electrode of the present embodiment. As shown in FIG. 4, the pixel electrode 42 includes a main truck 420, a plurality of first branches 421, a plurality of second branches 422, a plurality of third branches 423, and a plurality of fourth branches 424. One end of each of the first branches 421, that of each of the second branches 422, that of each of the third branches 423, and that of each of the fourth branches 424 are connected to the main truck 420. The first branches 421 are substantially parallel to each other and two of the first branches 421 neighboring to each other form a first slit 441. The second branches 422 are substantially parallel to each other and two of the second branches 422 neighboring to each other form a second slit 442. The third branches 423 are substantially parallel to each other and two of the third branches 423 neighboring to each other form a third slit 443. The fourth branches 424 are substantially parallel to each other and two of the fourth branches 424 neighboring to each other form a fourth slit 444. Due to that the aligning direction of the liquid crystal molecules 40L is affected by the pattern of the pixel electrode 42, the first aligning direction of the liquid crystal molecules disposed in the first alignment region 321 will be substantially parallel to the first branches 421 and the first slits 441. Similarly, the second aligning direction of the liquid crystal molecules 40L disposed in the second alignment region 322 will be substantially parallel to the second branches 422 and the second slits 442. The third aligning direction of the liquid crystal molecules 40L disposed in the third alignment region 323 will be substantially parallel to the third branches 423 and the third slits 443. The fourth aligning direction of the liquid crystal molecules 40L disposed in the fourth alignment region 324 will be substantially parallel to the fourth branches 424 and the fourth slits 444.

Figure 5:
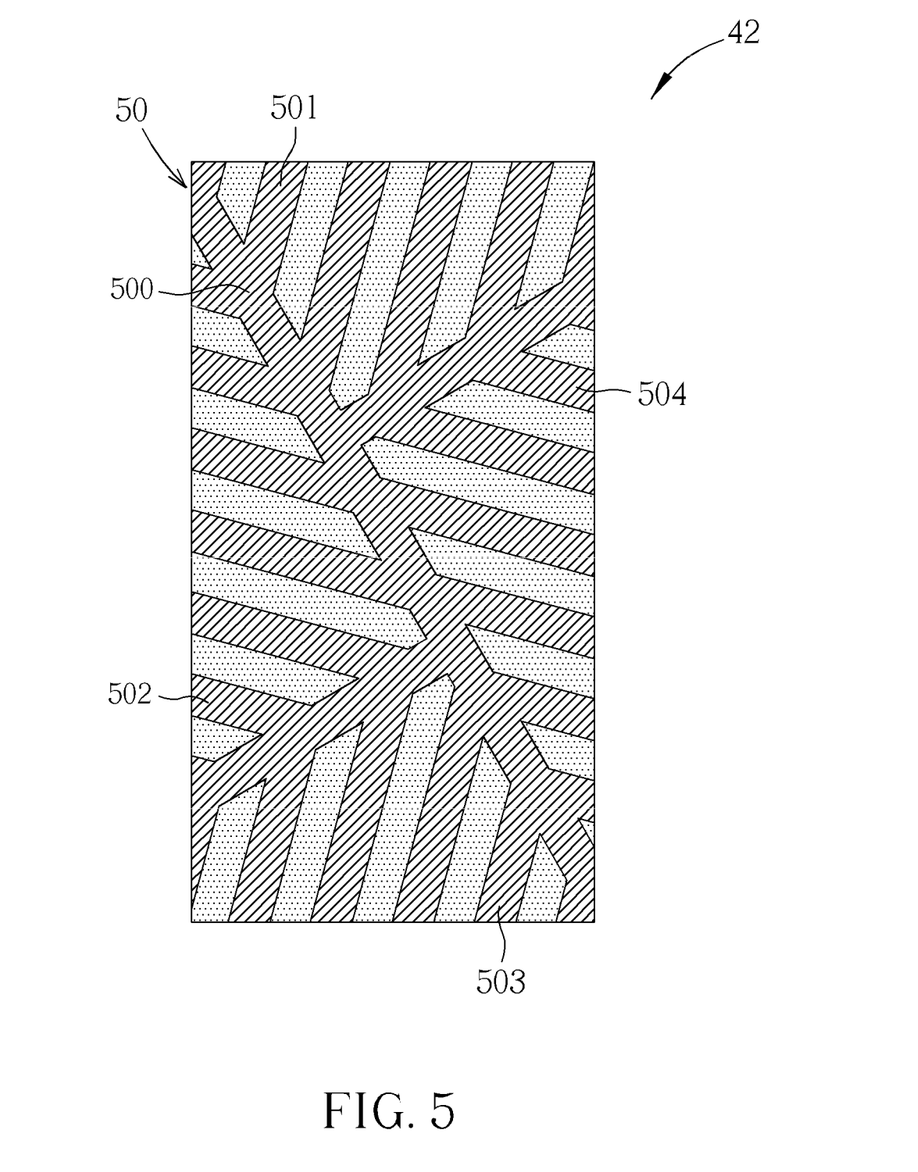
FIG. 5 is a schematic diagram showing a pixel electrode and a bump structure according to another embodiment of the present invention.

In the previously-mentioned embodiment, different aligning directions of the liquid crystal molecules disposed in different alignment regions are achieved by pattern design of the pixel electrode, but the present invention is not limited to this embodiment. Refer to FIG. 5, along with FIG. 2 and FIG. 3. FIG. 5 is a schematic diagram showing a pixel electrode and a bump structure according to another embodiment of the present invention. As shown in FIG. 5, the pixel structure of the present embodiment includes a pixel electrode 42 and a bump structure 50. The structure of the pixel electrode 42 is an integral electrode which has an intact plane disposed between the first substrate 32 and the liquid crystal layer 40, and the bump structure 50 is disposed on a side of the second substrate 34 facing the first substrate 32. The bump structure 50 may include a main bump 500, a plurality of first subsidiary bumps 501, a plurality of second subsidiary bumps 502, a plurality of third subsidiary bumps 503, and a plurality of fourth subsidiary bumps 504. The first subsidiary bumps 501 are disposed in the first alignment region 321 and an azimuth angle of each of the first subsidiary bumps 501 is substantially between 70 and 110 degrees. The second subsidiary bumps 502 are disposed in the second alignment region 322 and an azimuth angle of each of the second subsidiary bumps 502 is substantially between 160 and 200 degrees. The third subsidiary bumps 503 are disposed in the third alignment region 323 and an azimuth angle of each of the third subsidiary bumps 503 is substantially between 250 and 290 degrees. The fourth subsidiary bumps 504 are disposed in the fourth alignment region 324 and an azimuth angle of each of the fourth subsidiary bumps 504 is substantially between −20 and 20 degrees. In the present embodiment, due to that the aligning direction of the liquid crystal molecules 40L is affected by the pattern of the bump structure 50, the first aligning direction of the liquid crystal molecules 40L disposed in the first alignment region 321 will be substantially parallel to the first subsidiary bumps 501. Similarly, the second aligning direction of the liquid crystal molecules 40L disposed in the second alignment region 322 will be substantially parallel to the second subsidiary bumps 502. The third aligning direction of the liquid crystal molecules 40L disposed in the third alignment region 323 will be substantially parallel to the third subsidiary bumps 503. The fourth aligning direction of the liquid crystal molecules 40L disposed in the fourth alignment region 324 will be substantially parallel to the fourth subsidiary bumps 504.

Figure 6:
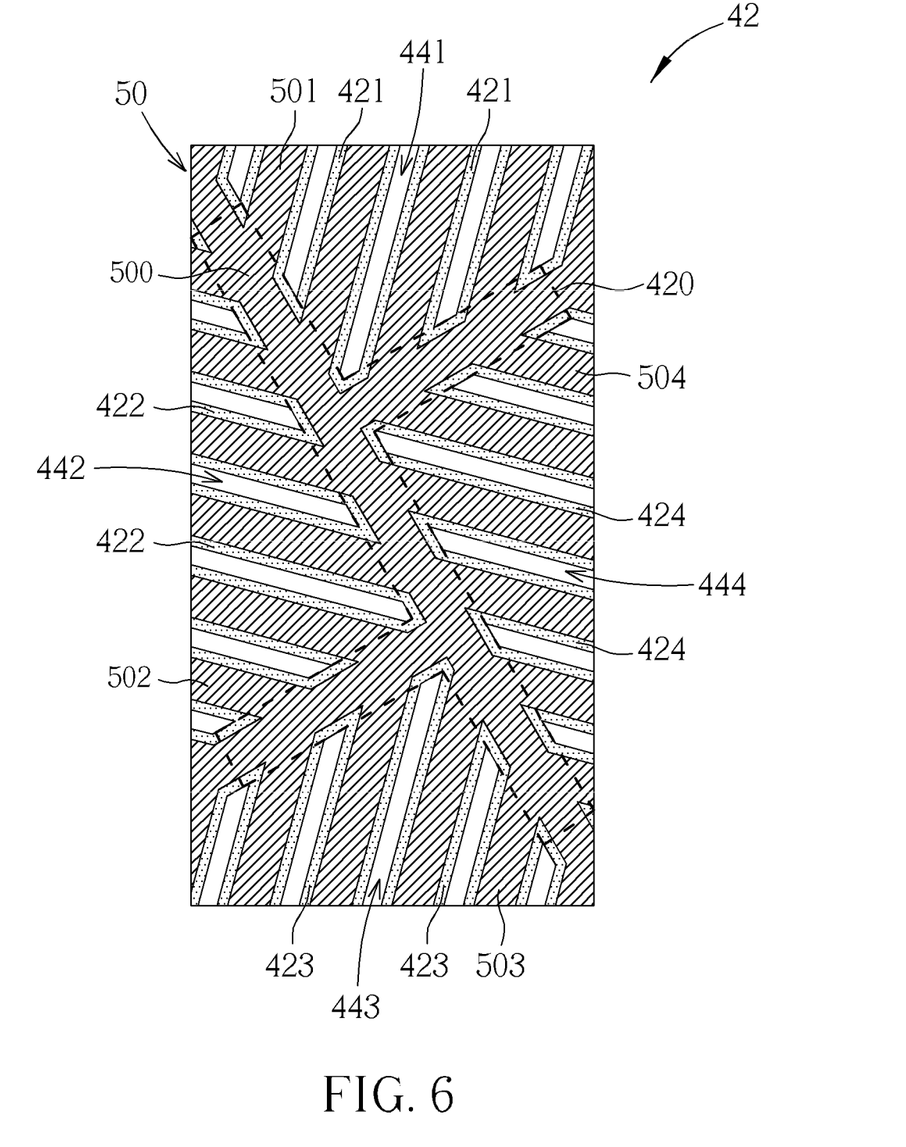
FIG. 6 is a schematic diagram showing a pixel electrode and a bump structure according to another embodiment of the present invention.

Refer to FIG. 6, along with FIG. 2 and FIG. 3. FIG. 6 is a schematic diagram showing a pixel electrode and a bump structure according to another embodiment of the present invention. As shown in FIG. 6, the pixel structure of the present embodiment includes the pixel electrode 42 and the bump structure 50. The pixel electrode 42 is disposed between the first substrate 32 and the liquid crystal layer 40. Different from FIG. 5, the pixel electrode 42 of the present embodiment is not an integral electrode structure but includes the main truck 420 as well as the first branches 421, the second branches 422, the third branches 423, and the fourth branches 424. The bump structure 50 is disposed on a side of the second substrate 34 facing the first substrate 32. The pattern of the bump structure 50 is similar to that of the pixel electrode 42 in FIG. 4, but its width may be less than that of the pixel electrode 42. For example, the bump structure 50 may include a main bump 500, a plurality of first subsidiary bumps 501, a plurality of second subsidiary bumps 502, a plurality of third subsidiary bumps 503 and a plurality of fourth subsidiary bumps 504. The main bump 500 is substantially corresponding to the main truck 420 of the pixel electrode 421; the first subsidiary bumps 501, the second subsidiary bumps 502, the third subsidiary bumps 503, and the fourth subsidiary bumps 504 are respectively corresponding to the first branches 421, the second branches 422, the third branches 423, and the fourth branches 424 of the pixel electrode 42. In the present embodiment, due to that the aligning direction of the liquid crystal molecules 40L are affected by the pattern of both the pixel electrode 42 and the bump structure 50, the first aligning direction of the liquid crystal molecules 40 L disposed in the first alignment region 321 will be substantially parallel to the first branches 421, the first subsidiary bumps 501, and the first slits 441. Similarly, the second aligning direction of the liquid crystal molecules 40L disposed in the second alignment region 322 will be substantially parallel to the second branches 422, the second subsidiary bumps 502, and the second slits 442. The third aligning direction of the liquid crystal molecules 40L disposed in the third alignment region 323 will be substantially parallel to the third branches 423, the third subsidiary bumps 503, and the third slits 443. The fourth aligning direction of the liquid crystal molecules 40L disposed in the fourth alignment region 324 will be substantially parallel to the fourth branches 424, the fourth subsidiary bumps 504, and the fourth slits 444. It is to be noted that the aligning direction of the liquid crystal molecules 40L may be, but not limited to being, subject to the pattern of the pixel electrode 42, or the pattern of both the pixel electrode 42 and the bump structure 50; it may be subject to the pattern of the bump structure 50 alone.

Figure 7:
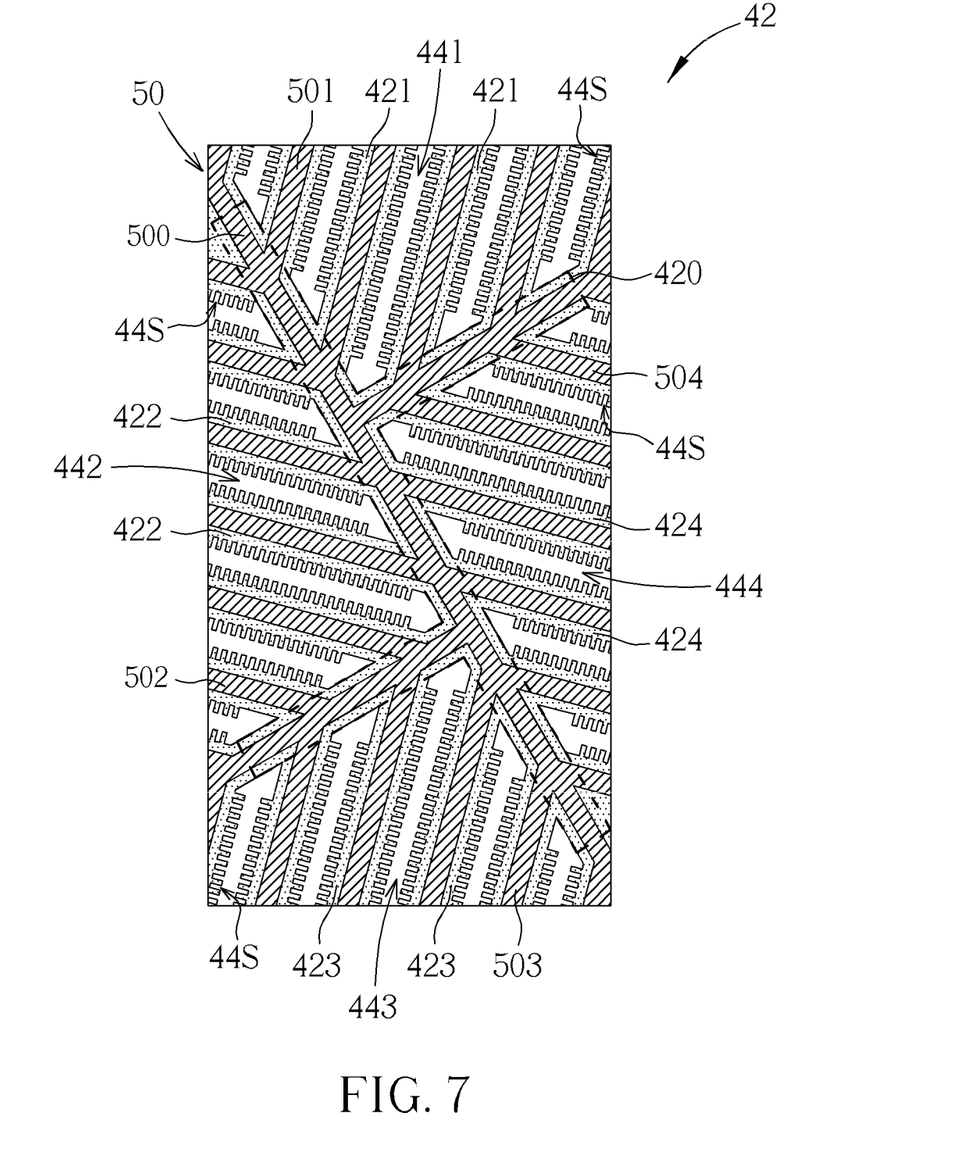
FIG. 7 is a schematic diagram showing a pixel electrode and a bump structure according to another embodiment of the present invention.

FIG. 7 is a schematic diagram showing a pixel electrode and a bump structure according to another embodiment of the present invention. As shown in FIG. 7, the present embodiment is different from the previously-mentioned embodiments in that the pixel electrode 42 has a fine slit structure 44S in addition to the first slits 441, the second slits 442, the third slits 443, and the fourth slits 444.

In the previously-mentioned embodiments, the MVA LCD device with four alignment regions is exemplarily illustrated, but the present invention is not limited to the MVA LCD device with four alignment regions. For instances, the MVA LCD device may have two alignment regions, three alignment regions, or more alignment regions. The MVA LCD device with two alignment regions and that with three alignment regions are described as follows. However, the present invention is not limited to the embodiments. The alignment regions and the azimuth angles of the aligning directions can be arranged according to different design and demand. In order to simplify the specification, only the differences between the present embodiments and the previously-mentioned embodiments will be described, and their similarities will be omitted.

Figure 8:
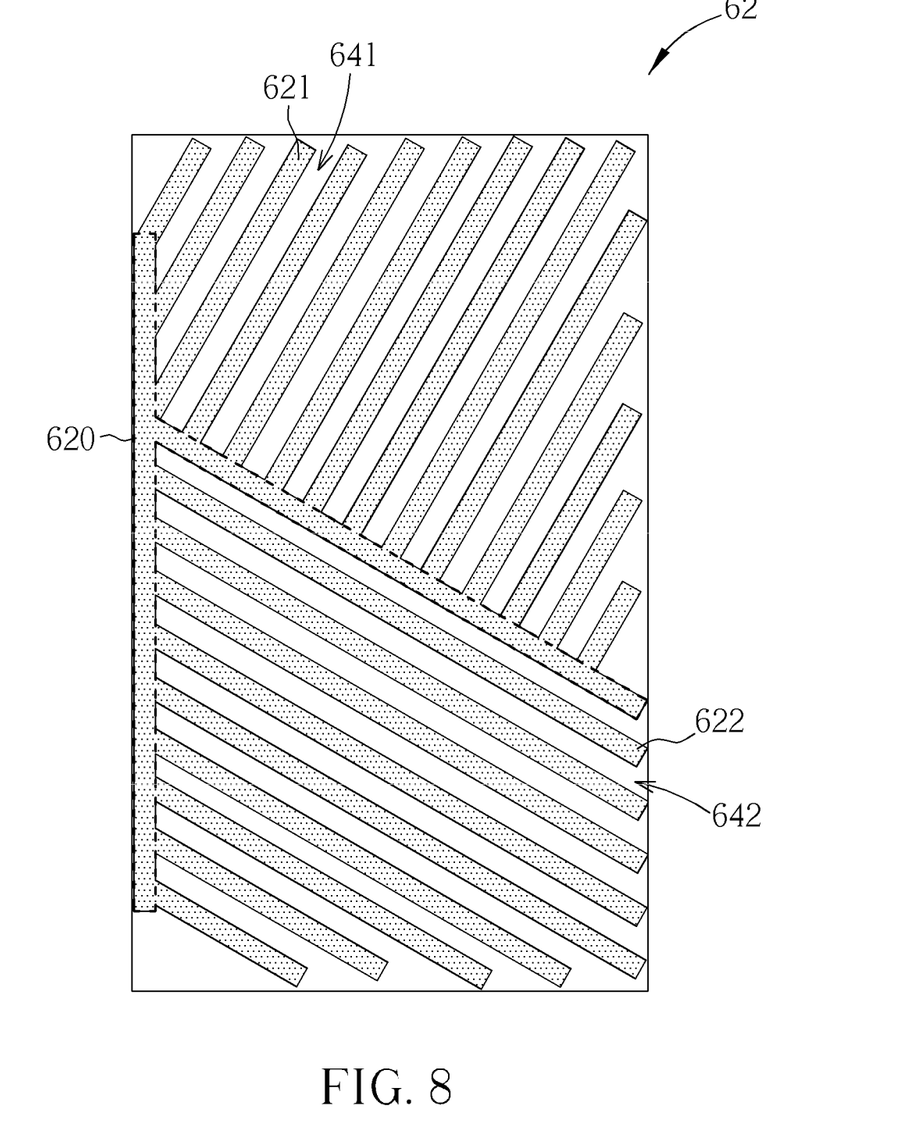
FIG. 8 and FIG. 9 are schematic diagrams showing a pixel electrode of an MVA LCD device with two alignment regions according to two other preferred embodiments of the present invention.
Figure 9:
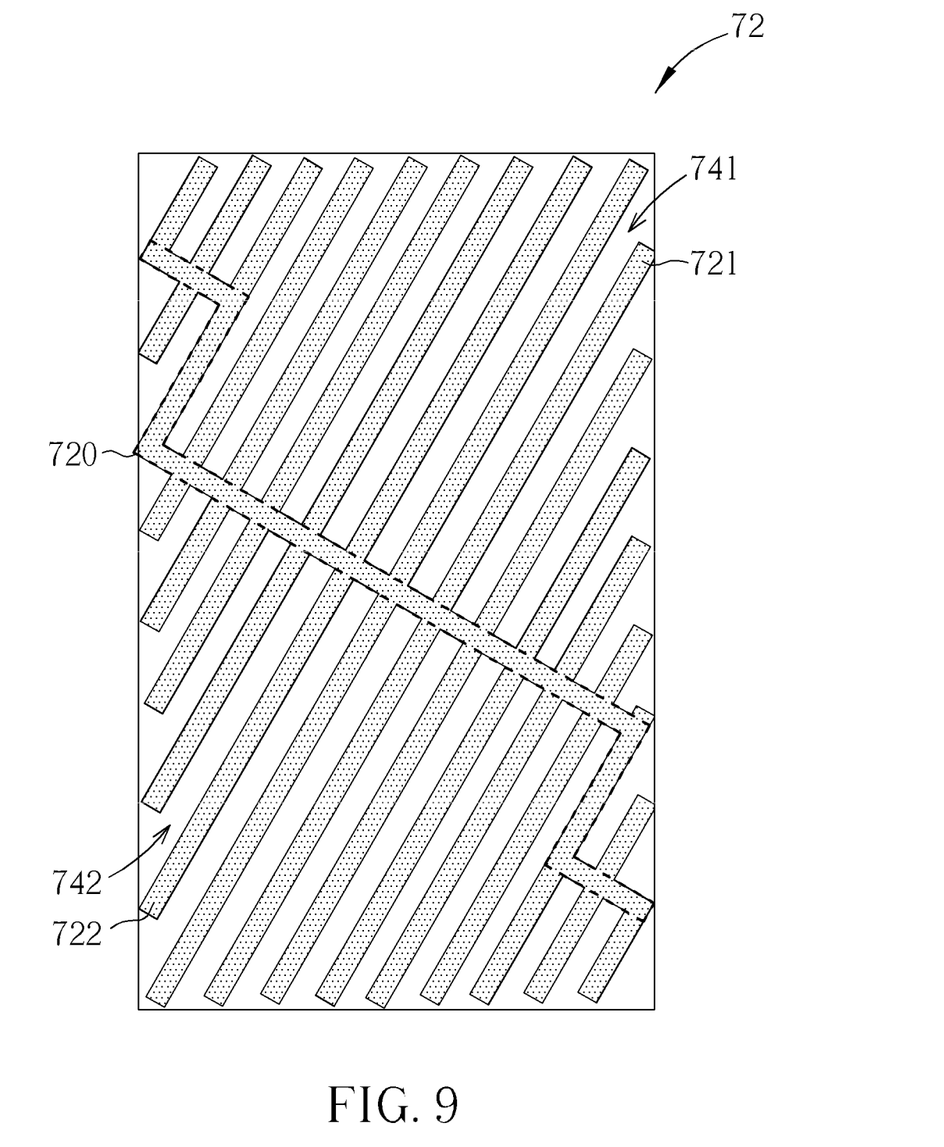

FIG. 8 and FIG. 9 are schematic diagrams showing a pixel electrode of an MVA LCD device with two alignment regions according to two other preferred embodiments of the present invention. As shown in FIG. 8, in the present embodiment, the pixel electrode 62 of the MVA LCD device includes a main truck 620, a plurality of first branches 621, and a plurality of second branches 622. One end of each of the first branches 621 and that of each of the second branches 622 are connected to the main truck 620. The first branches 621 are substantially parallel to each other and two of the first branches 621 neighboring to each other form a first slit 641; the second branches 622 are substantially parallel to each other and two of the second branches 622 neighboring to each other form a second slit 642. The first aligning direction of the liquid crystal molecules disposed in the first alignment region are substantially parallel to the first branches 621 and the first slits 641. That is, an azimuth angle of the first aligning direction is substantially between 70 and 110 degrees, preferably between 70 and 80 degrees, or preferably between 80 and 100 degrees, or preferably between 100 and 110 degrees. Similarly, the second aligning direction of the liquid crystal molecules disposed in the second alignment region are substantially parallel to the second branches 622 and the second slits 642. That is, an azimuth angle of the second aligning direction is substantially between 160 and 200 degrees, preferably between 160 and 170 degrees, or preferably between 170 and 190 degrees, or preferably between 190 and 200 degrees.

As shown in FIG. 9, in the present embodiment, the pixel electrode 72 of the MVA LCD device includes a main truck 720, a plurality of first branches 721, and a plurality of second branches 722. One end of each of the first branches 721 and that of each of the second branches 722 are connected to the main truck 720. The first branches 721 are substantially parallel to each other and two of the first branches 721 neighboring to each other form s first slit 741. The second branches 722 are substantially parallel to each other and two of the second branches 722 neighboring to each other form a second slit 742. The first aligning direction of the liquid crystal molecules disposed in the first alignment region is substantially parallel to the first branches 721 and the first slits 741. That is, an azimuth angle of the first aligning direction is substantially between 70 and 110 degrees, preferably between 70 and 80 degrees, or preferably between 80 and 100 degrees, or preferably between 100 and 110 degrees. Similarly, the second aligning direction of the liquid crystal molecules disposed in the second alignment region is substantially parallel to the second branches 722 and the second slits 742. That is, an azimuth angle of the second aligning direction is substantially between 250 and 290 degrees, preferably between 250 and 260 degrees, or preferably between 260 and 280 degrees, or preferably between 280 and 290 degrees.

Figure 10:
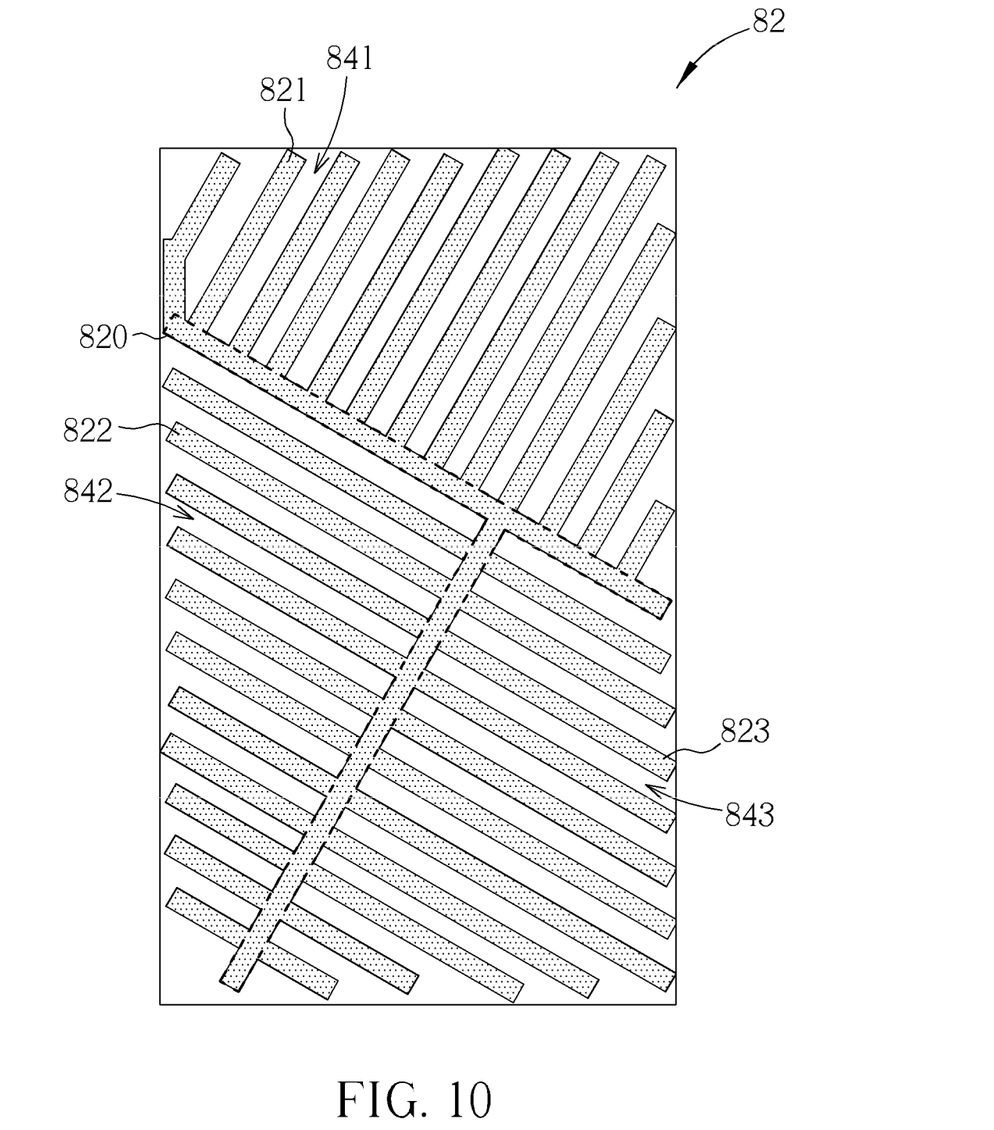
FIG. 10 and FIG. 11 are schematic diagrams showing a pixel electrode of an MVA LCD device with three alignment regions according to two other preferred embodiments of the present invention.
Figure 11:
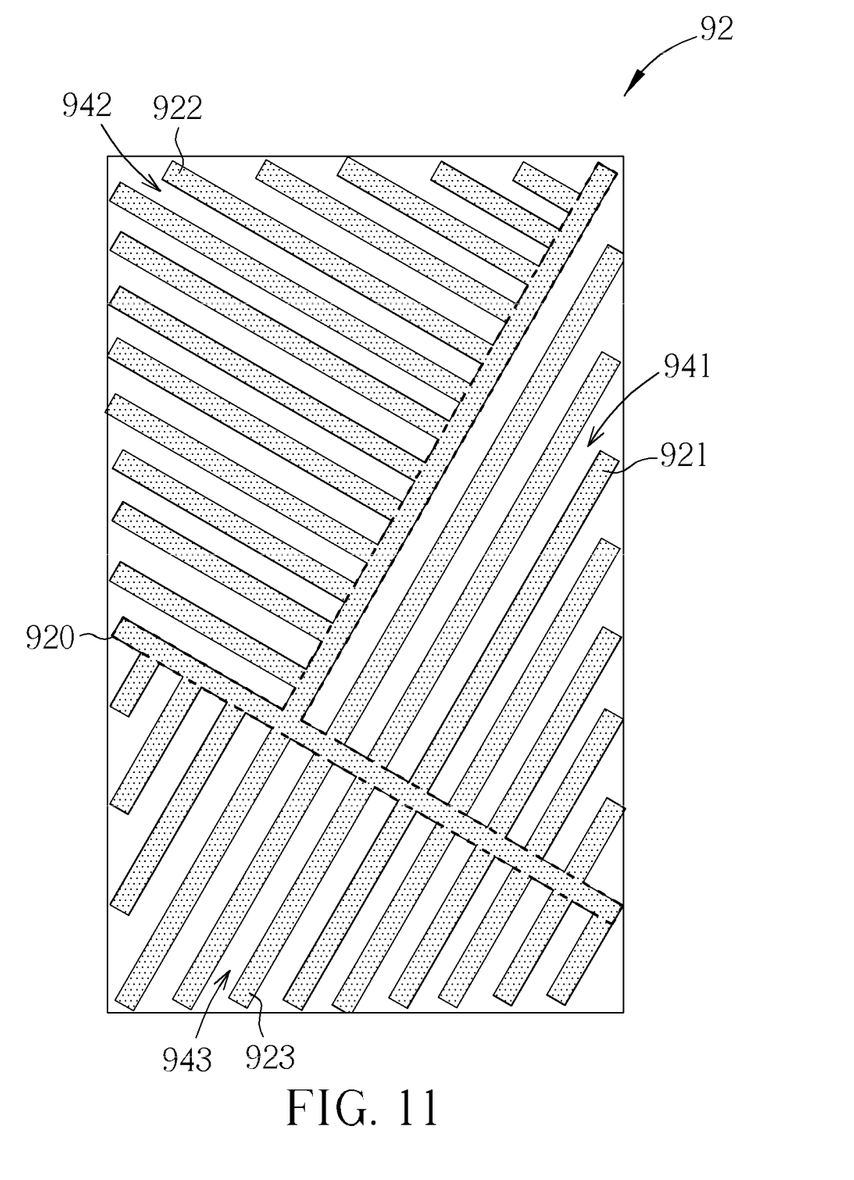

FIG. 10 and FIG. 11 are schematic diagrams showing a pixel electrode of an MVA LCD device with three alignment regions according to two other preferred embodiments of the present invention. As shown in FIG. 10, in the present embodiment, the pixel electrode 82 of the MVA LCD device includes a main truck 820, a plurality of first branches 821, a plurality of second branches 822, and a plurality of third branches 823. One end of each of the first branches 821, that of each of the second branches 822, and that of each of the third branches 823 are connected to the main truck 820. The first branches 821 are substantially parallel to each other and two of the first branches 821 neighboring to each other form a first slit 841. The second branches 822 are substantially parallel to each other and two of the second branches 822 neighboring to each other form a second slit 842. The third branches 823 are substantially parallel to each other and two of the third branches 823 neighboring to each other form a third slit 843. The first aligning direction of the liquid crystal molecules disposed in the first alignment region is substantially parallel to the first branches 821 and the first slits 841; that is, an azimuth angle of the first aligning direction is substantially between 70 and 110 degrees, preferably between 70 and 80 degrees, or preferably between 80 and 100 degrees, or preferably between 100 and 110 degrees. Similarly, the second aligning direction of the liquid crystal molecules disposed in the second alignment region is substantially parallel to the second branches 822 and the second slits 842; that is, an azimuth angle of the second aligning direction is substantially between 160 and 200 degrees, preferably between 160 and 170 degrees, or preferably between 170 and 190 degrees, or preferably between 190 and 200 degrees. The third aligning direction of the liquid crystal molecules disposed in the third alignment region is substantially parallel to the third branches 823 and the third slits 843; that is, an azimuth angle of the third aligning direction is substantially between −20 degrees (also represented as 340 degrees) and 20 degrees, preferably between −20 and −10 degrees (also represented as 350 degrees), or preferably between −10 and 10 degrees, or preferably between 10 and 20 degrees.

As shown in FIG. 11, in the present embodiment, the pixel electrode 92 of the MVA LCD device includes a main truck 920, a plurality of first branches 921, a plurality of second branches 922, and a plurality of third branches 923. One end of each of the first branches 921, that of each of the second branches 922, and that of each of the third branches 923 are connected to the main truck 920. The first branches 921 are substantially parallel to each other and two of the first branches 921 neighboring to each other form a first slit 941. The second branches 922 are substantially parallel to each other and two of the second branches 922 neighboring to each other form a second slit 942. The third branches 923 are substantially parallel to each other and two of the third branches 923 neighboring to each other form a third slit 943. The first aligning direction of the liquid crystal molecules disposed in the first alignment region is substantially parallel to the first branches 921 and the first slits 941; that is, an azimuth angle of the first aligning direction is substantially between 70 and 110 degrees, preferably between 70 and 80 degrees, or preferably between 80 and 100 degrees, or preferably between 100 and 110 degrees. Similarly, the second aligning direction of the liquid crystal molecules disposed in the second alignment region is substantially parallel to the second branches 922 and the second slits 942; that is, an azimuth angle of the second aligning direction is substantially between 160 and 200 degrees, preferably between 160 and 170 degrees, or preferably between 170 and 190 degrees, or preferably between 190 and 200 degrees. The third aligning direction of the liquid crystal molecules disposed in the third alignment region is substantially parallel to the third branches 923 and the third slits 943; that is, an azimuth angle of the third aligning direction is substantially between 250 and 290 degrees, preferably between 250 and 260 degrees, or preferably between 260 and 280 degrees, or preferably between 280 and 290 degrees.

In summary, the pixel structure of the MVA LCD device provided by the present invention has an azimuth angle of the absorption axis of the second polarization plate, which is between 115 and 155 degrees; thus the polarization direction of the light passing through the second polarization plate will be between 25 and 65 degrees, instead of horizontally-polarized light. Therefore, the observers wearing polarized sunglasses with an effect of horizontally-polarized light filters are able to watch the display images of the MVA LCD device normally. In addition, the characteristic of wide viewing angles of the MVA LCD device of the present invention when viewed from diverse observation directions will be obtained by virtue of the pattern design of the pixel electrode.

Those skilled in the art will readily observe that numerous modifications and alterations of the device and method may be made while retaining the teachings of the invention.

What is claimed is:

1. A multi-domain vertical alignment (MVA) liquid crystal display (LCD) device, comprising:
    a first substrate including a first alignment region and a second alignment region;
    a second substrate disposed opposite to the first substrate;
    a liquid crystal layer including a plurality of liquid crystal molecules disposed between the first substrate and the second substrate, wherein the plurality of liquid crystal molecules disposed in the first alignment region have a first aligning direction, the plurality of liquid crystal molecules disposed in the second alignment region have a second aligning direction different from the first aligning direction, and an azimuth angle of the first aligning direction and an azimuth angle of the second aligning direction are respectively selected from one of following ranges: substantially between 70 degrees and 110 degrees, substantially between 160 degrees and 200 degrees, substantially between 250 degrees and 290 degrees, and substantially between −20 degrees and 20 degrees; and
    a pixel electrode disposed between the first substrate and the liquid crystal layer.

2. The MVA LCD device of claim 1, further comprising:
    a first polarization plate having a first absorption axis, wherein an azimuth angle of the first absorption axis is substantially between 25 degrees and 65 degrees; and
    a second polarization plate having a second absorption axis, wherein the first absorption axis of the first polarization plate and the second absorption axis of the second polarization plate are substantially perpendicular to each other.

3. The MVA LCD device of claim 1, wherein the pixel electrode has a fine slit structure.

4. The MVA LCD device of claim 1, wherein the pixel electrode comprises at least a main truck, a plurality of first branches, and a plurality of second branches, and an end of each of the plurality of first branches and an end of each of the plurality of second branches are connected to the main truck.

5. The MVA LCD device of claim 4, wherein the plurality of first branches are substantially parallel to each other, two of the plurality of first branches neighboring to each other form a first slit, the plurality of second branches are substantially parallel to each other, two of the plurality of second branches neighboring to each other form a second slit, the plurality of first branches and the plurality of first slits are substantially parallel to the first aligning direction, and the plurality of second branches and the plurality of second slits are substantially parallel to the second aligning direction.

6. The MVA LCD device of claim 1, further comprising a bump structure disposed on a side of the second substrate facing the first substrate, wherein the bump structure comprises a main bump, a plurality of first subsidiary bumps and a plurality of second subsidiary bumps, the plurality of first subsidiary bumps are substantially parallel to the first aligning direction, and the plurality of second subsidiary bumps are substantially parallel to the second aligning direction.

7. The MVA LCD device of claim 1, wherein the first substrate further comprises a third alignment region, the plurality of liquid crystal molecules disposed in the third alignment region have a third aligning direction, and an azimuth angle of the third aligning direction is selected from one of following ranges: substantially between 70 degrees and 110 degrees, substantially between 160 degrees and 200 degrees, substantially between 250 degrees and 290 degrees, and substantially between −20 degrees and 20 degrees.

8. The MVA LCD device of claim 7, wherein the pixel electrode further comprises a main truck and a plurality of third branches, and an end of each of the plurality of third branches is connected to the main truck.

9. The MVA LCD device of claim 8, wherein the plurality of third branches are substantially parallel to each other, two of the plurality of third branches neighboring to each other form a third slit, and the plurality of third branches and the plurality of third slits are substantially parallel to the third aligning direction.

10. The MVA LCD device of claim 7, further comprising a bump structure disposed on a side of the second substrate facing the first substrate, wherein the bump structure includes a plurality of third subsidiary bumps, the plurality of third subsidiary bumps are substantially parallel to the third aligning direction.

11. The MVA LCD device of claim 1, wherein the first substrate further comprises a fourth alignment region, the plurality of liquid crystal molecules disposed in the fourth alignment region have a fourth aligning direction, and an azimuth angle of the fourth aligning direction is selected from one of following ranges:
    substantially between 70 degrees and 110 degrees, substantially between 160 degrees and 200 degrees, substantially between 250 degrees and 290 degrees, and substantially between −20 degrees and 20 degrees.

12. The MVA LCD device of claim 11, wherein the pixel electrode further comprises a main truck and a plurality of fourth branches, and an end of each of the plurality of fourth branches is connected to the main truck.

13. The MVA LCD device of claim 12, wherein the plurality of fourth branches are substantially parallel to each other, two of the plurality of fourth branches neighboring to each other form a fourth slit, and the plurality of fourth branches and the plurality of fourth slits are substantially parallel to the fourth aligning direction.

14. The MVA LCD device of claim 11, further comprising a bump structure disposed on a side of the second substrate facing the first substrate, wherein the bump structure includes a plurality of fourth subsidiary bumps, and the plurality of fourth subsidiary bumps are substantially parallel to the fourth aligning direction.

15. The MVA LCD device of claim 2, wherein the azimuth angle of the first absorption axis is substantially between 25 degrees and 35 degrees.

16. The MVA LCD device of claim 15, wherein the azimuth angle of the first aligning direction and the azimuth angle of the second aligning direction are respectively selected from one of following ranges: substantially between 70 degrees and 80 degrees, substantially between 160 degrees and 170 degrees, substantially between 250 degrees and 260 degrees, and substantially between −20 degrees and −10 degrees.

17. The MVA LCD device of claim 15, wherein the first substrate further comprises a third alignment region, the plurality of liquid crystal molecules disposed in the third alignment region have a third aligning direction, and an azimuth angle of the third aligning direction is selected from one of following ranges: substantially between 70 degrees and 80 degrees, substantially between 160 degrees and 170 degrees, substantially between 250 degrees and 260 degrees, and substantially between −20 degrees and −10 degrees.

18. The MVA LCD device of claim 15, wherein the first substrate further comprises a fourth alignment region, the plurality of liquid crystal molecules disposed in the fourth alignment region have a fourth aligning direction, and an azimuth angle of the fourth aligning direction is selected from one of following ranges: substantially between 70 degrees and 80 degrees, substantially between 160 degrees and 170 degrees, substantially between 250 degrees and 260 degrees, and substantially between −20 degrees and −10 degrees.

19. The MVA LCD device of claim 2, wherein the azimuth angle of the first absorption axis is substantially between 35 degrees and 55 degrees.

20. The MVA LCD device of claim 19, wherein the azimuth angle of the first aligning direction and the azimuth angle of the second aligning direction are respectively selected from one of following ranges: substantially between 80 degrees and 100 degrees, substantially between 170 degrees and 190 degrees, substantially between 260 degrees and 280 degrees, and substantially between −10 degrees and 10 degrees.

21. The MVA LCD device of claim 19, wherein the first substrate further comprises a third alignment region, the plurality of liquid crystal molecules disposed in the third alignment region have a third aligning direction, and an azimuth angle of the third aligning direction is selected from one of following ranges: substantially between 80 degrees and 100 degrees, substantially between 170 degrees and 190 degrees, substantially between 260 degrees and 280 degrees, and substantially between −10 degrees and 10 degrees.

22. The MVA LCD device of claim 19, wherein the first substrate further comprises a fourth alignment region, the plurality of liquid crystal molecules disposed in the fourth alignment region have a fourth aligning direction, and an azimuth angle of the fourth aligning direction is selected from one of following ranges: substantially between 80 degrees and 100 degrees, substantially between 170 degrees and 190 degrees, substantially between 260 degrees and 280 degrees, and substantially between −10 degrees and 10 degrees.

23. The MVA LCD device of claim 2, wherein the azimuth angle of the first absorption axis is substantially between 55 degrees and 65 degrees.

24. The MVA LCD device of claim 23, wherein the azimuth angle of the first aligning direction and the azimuth angle of the second aligning direction are respectively selected from one of following ranges: substantially between 100 degrees and 110 degrees, substantially between 190 degrees and 200 degrees, substantially between 280 degrees and 290 degrees, and substantially between 10 degrees and 20 degrees.

25. The MVA LCD device of claim 23, wherein the first substrate further comprises a third alignment region, the plurality of liquid crystal molecules disposed in the third alignment region have a third aligning direction, and an azimuth angle of the third aligning direction is selected from one of following ranges: substantially between 100 degrees and 110 degrees, substantially between 190 degrees and 200 degrees, substantially between 280 degrees and 290 degrees, and substantially between 10 degrees and 20 degrees.

26. The MVA LCD device of claim 23, wherein the first substrate further comprises a fourth alignment region, the plurality of liquid crystal molecules disposed in the fourth alignment region have a fourth aligning direction, and an azimuth angle of the fourth aligning direction is selected from one of following ranges: substantially between 100 degrees and 110 degrees, substantially between 190 degrees and 200 degrees, substantially between 280 degrees and 290 degrees, and substantially between 10 degrees and 20 degrees.

* * * * *